(12) United States Patent
Dolgunov et al.

(10) Patent No.: US 8,726,040 B2
(45) Date of Patent: *May 13, 2014

(54) MEMORY RANDOMIZATION FOR PROTECTION AGAINST SIDE CHANNEL ATTACKS

(75) Inventors: Boris Dolgunov, Ramat Gan (IL); Arseniy Aharonov, Arad (IL)

(73) Assignee: SanDisk Technologies Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/486,668

(22) Filed: Jun. 1, 2012

(65) Prior Publication Data

US 2012/0317423 A1     Dec. 13, 2012

Related U.S. Application Data

(63) Continuation of application No. 12/254,225, filed on Oct. 20, 2008, now Pat. No. 8,195,957.

(30) Foreign Application Priority Data

Oct. 30, 2007     (IL) .......................................... 187046

(51) Int. Cl.
| | |
|---|---|
| G06F 21/00 | (2013.01) |
| G06F 11/20 | (2006.01) |
| G06F 12/14 | (2006.01) |
| H04K 1/00 | (2006.01) |
| H04L 9/00 | (2006.01) |

(52) U.S. Cl.
USPC ............... 713/190; 713/189; 380/29; 380/44; 380/57

(58) Field of Classification Search
None
See application file for complete search history.

(56) References Cited

U.S. PATENT DOCUMENTS

| | | | |
|---|---|---|---|
| 6,272,637 B1 | 8/2001 | Little et al. | |
| 6,724,663 B2 | 4/2004 | Roohparvar et al. | |
| 6,792,528 B1* | 9/2004 | Hou | 380/57 |
| 6,967,896 B2 | 11/2005 | Eisen et al. | |
| 7,873,837 B1* | 1/2011 | Lee et al. | 713/189 |
| 2002/0029345 A1 | 3/2002 | Kawasaki et al. | |
| 2005/0010789 A1 | 1/2005 | Liang | |
| 2006/0039554 A1* | 2/2006 | Fry | 380/29 |

(Continued)

FOREIGN PATENT DOCUMENTS

| | | |
|---|---|---|
| EP | 1172731 | 1/2002 |
| WO | WO-9847060 | 10/1998 |
| WO | WO-0201368 | 1/2002 |
| WO | WO-2005015818 | 2/2005 |

OTHER PUBLICATIONS

International Search Report and Written Opinion for PCT/IL/2008/001387, dated Feb. 6, 2009, 7 pages.

(Continued)

*Primary Examiner* — Shin-Hon Chen
(74) *Attorney, Agent, or Firm* — Brinks Gilson & Lione

(57) ABSTRACT

Side channel attacks against a computing device are prevented by combinations of scrambling data to be stored in memory and scrambling the memory addresses of the data using software routines to execute scrambling and descrambling functions. Encrypted versions of variables, data and lookup tables, commonly employed in cryptographic algorithms, are thus dispersed into pseudorandom locations. Data and cryptographic primitives that require data-dependent memory accesses are thus shielded from attacks that could reveal memory access patterns and compromise cryptographic keys.

16 Claims, 4 Drawing Sheets

(56) References Cited

U.S. PATENT DOCUMENTS

| | | | |
|---|---|---|---|
| 2006/0294289 A1* | 12/2006 | Ashmore | 711/100 |
| 2007/0136607 A1* | 6/2007 | Launchbury et al. | 713/190 |
| 2008/0288785 A1* | 11/2008 | Rao et al. | 713/190 |
| 2009/0086965 A1* | 4/2009 | Glendinning | 380/44 |

OTHER PUBLICATIONS

International Preliminary Report on Patentability for PCT/IL/2008/001387, dated May 14, 2010, 2 pages.

Office Action for U.S. Appl. No. 12/254,225, dated Mar. 21, 2011, 8 pages.

Office Action for U.S. Appl. No. 12/254,225, dated Sep. 13, 2011, 7 pages.

Notice of Allowance for U.S. Appl. No. 12/254,225, dated Feb. 6, 2012, 5 pages.

Halderman, et al., "Lest We Remember:" Cold Boot Attacks on Encryption Keys, Princeton University—School of Engineering and Applied Science (2008).

Dag Arne Osvik, et al., "Cache Attacks and Countermeasures: the Case of AES", (2005).

Goldreich, et al., "Software Protection and Simulation on Oblivious RAMs", (1993).

* cited by examiner

MEMORY RANDOMIZATION FOR PROTECTION AGAINST SIDE CHANNEL ATTACKS

RELATED APPLICATIONS

The present application is a continuation of U.S. patent application Ser. No. 12/254,225, filed Oct. 20, 2008, now U.S. Pat. No. 8,195,957 which claims priority to Israeli Patent App. No. 187046, filed Oct. 30, 2007, the entirety of each of which are hereby incorporated by reference.

BACKGROUND OF THE INVENTION

1. Field of the Invention

This invention relates to securing data that is used on a computing device. More particularly, this invention relates to prevention of side channel attacks that could lead to unauthorized access to information or information protection features on a computing device.

2. Description of the Related Art

Embedded security refers to security features built into a device, including physical tamper-resistance features, cryptographic keys and algorithms. Embedded security features can be found today on a variety of computing devices, e.g., personal computers and servers, cellular telephones, set-top boxes, and many appliances. The present invention is largely concerned with protection of data generally, and cryptographic keys in particular. The meanings of acronyms used in this disclosure are given in Table 1.

TABLE 1

| Acronyms and Abbreviations | |
| --- | --- |
| AES | Advanced Encryption Standard |
| CPU | Central Processing Unit |
| DRAM | Dynamic Random Access Memory |
| MOD | Modulo Operator |
| RAM | Random Access Memory |
| RSA | Rivest, Shamir, & Adleman |
| XOR | Exclusive Or Operator |

Nevertheless, such devices are potentially vulnerable to cache attacks, a form of side channel attack, in which interprocess leakage through the state of a memory cache reveals memory access patterns. Such patterns can be used for analysis of cryptographic primitives that employ data-dependent table lookups.

SUMMARY OF THE INVENTION

Cache memory access patterns can be inferred by an attacker who has infiltrated unauthorized software into a target device. Such unauthorized software, although unable to directly access secure resources, is able to determine cache access timing during execution of trusted software. In this way it is possible for the attacker to obtain information regarding access of elements in the buffers being accessed by the trusted software, and ultimately to derive information regarding private cryptographic keys. Aspects of the invention thwart such side channel attacks by scrambling the data and scrambling the addresses in memory at which data is stored under control of a process controlled by program instructions. Any memory access patterns that may be detected are thus masked, so as to frustrate attempts to derive information related to sensitive data, in particular private cryptographic keys used for data decryption. For example lookup tables, commonly employed in cryptographic algorithms, may be dispersed into pseudorandom locations. Indeed, many cryptographic primitives that require data-dependent memory accesses can be thus shielded.

An embodiment of the invention provides a method for concealing information, which is carried out by accessing, by a computing device, a memory having memory addresses. For each memory address identified for access, a one-to-one address relationship is applied to such memory address to generate a scrambled memory address, and data is written into the memory at the scrambled memory address. The applying and writing are also performed by the computing device. The method may be carried out by instantiating and executing instructions of a program.

One aspect of the method includes applying, prior to writing the data, a data function to a prescrambled data to generate a scrambled data, and writing the scrambled data into the memory.

Another aspect of the method includes applying the one-to-one address relationship a second time to read the data from the memory at the scrambled memory address.

A further aspect of the method includes applying a second data function to the scrambled data to recover the prescrambled data.

An additional aspect of the method comprises applying the data function a first time using a first data encryption key to a first prescrambled data and applying the data function a second time to a second prescrambled data using a second data encryption key to generate a first scrambled data and a second scrambled data, respectively.

According to yet another aspect of the method, applying the one-to-one address relationship includes applying the one-to-one address relationship a first time to a first prescrambled memory address using a first address encryption key and applying the one-to-one address relationship a second time to a second prescrambled memory address using a second address encryption key to generate a first scrambled memory address and a second scrambled memory address, respectively.

Still another aspect of the method includes constructing an address scrambling table and a data scrambling table, generating an encrypted secret key and a decrypted secret key, and generating an encrypted data and decrypted data by accessing the data scrambling table to obtain data scrambling entries therefrom. The method is further carried out by applying a data scrambling function to the data, to the encrypted secret key and to the data scrambling entries to generate the encrypted and decrypted data and to obtain the encrypted and decrypted secret key for storage in the memory and retrieval from the memory respectively, distributing the encrypted secret key and the encrypted data in the memory at respective encrypted addresses by accessing the address scrambling table to obtain address scrambling entries therefrom, applying an address scrambling function to the designated addresses and to the address scrambling entries to obtain the encrypted addresses, and accessing the memory at the encrypted addresses for respective storage and retrieval of the encrypted secret key and the encrypted data at the encrypted addresses, and retrieval of the decrypted data and the decrypted secret key. The data may comprise at least one of said address scrambling table and said data scrambling table.

An embodiment of the invention provides a computing device including at least one memory having program instructions stored therein, and a processor that accesses the memory to execute the instructions, wherein the instructions cause the processor to apply a one-to-one address relationship to a prescrambled memory address for generating a scrambled memory address, and write data into the memory at the scrambled memory address.

According to an aspect of the computing device, the instructions cause the processor, prior to storing the data, to apply a data function to prescrambled data to generate scrambled data for storage in the memory as the data.

According to still another aspect of the computing device, the instructions cause the processor to execute the instructions to apply a second data function to the scrambled data to recover the prescrambled data.

According to yet another aspect of the computing device, applying the data function includes executing the data function a first time by applying a first data encryption key to first prescrambled data and executing the data function a second time by applying a second data encryption key to second prescrambled data to generate first scrambled data and second scrambled data, respectively.

According to an additional aspect of the computing device, the instructions cause the processor to apply the one-to-one address relationship a second time to read the data from the memory at the scrambled memory address.

According to a further aspect of the computing device, applying the one-to-one address relationship includes executing the one-to-one address relationship a first time by applying a first address encryption key to a first prescrambled memory address and executing the one-to-one address relationship a second time by applying a second address encryption key to a second prescrambled memory address to generate a first scrambled memory address and a second scrambled memory address, respectively.

An embodiment of the invention provides a computing device, including at least one random access memory for storage and retrieval of data at designated addresses. The memory has program instructions and a secret key stored therein. A processor accesses the memory to execute the instructions and to access the data at the designated addresses, wherein the instructions cause the processor to construct an address scrambling table and a data scrambling table, and to execute read and write accesses of the memory to store and retrieve the instructions and the data at the designated addresses. The processor is operative to generate an encrypted secret key and a decrypted secret key, and to generate encrypted data and decrypted data by accessing the data scrambling table to obtain data scrambling entries therefrom and applying a data scrambling function to the data, to the secret key and to the data scrambling entries to generate the encrypted data and the decrypted data. The processor is operative to obtain the encrypted secret key and the decrypted secret key for storage in the memory and retrieval from the memory respectively. The processor is operative for distributing the encrypted secret key and the encrypted data in the memory at respective encrypted addresses by accessing the address scrambling table to obtain address scrambling entries therefrom, applying an address scrambling function to the designated addresses and to the address scrambling entries to obtain the encrypted addresses, and accessing the memory at the encrypted addresses for respective storage and retrieval of the encrypted secret key and the encrypted data at the encrypted addresses, and for retrieval of the decrypted data and the decrypted secret key.

BRIEF DESCRIPTION OF THE DRAWINGS

For a better understanding of various aspects and embodiments of the present invention, reference is made to the detailed description of such embodiments, by way of example, which is to be read in conjunction with the following drawings, wherein like elements are given like reference numerals, and wherein.

DETAILED DESCRIPTION OF THE INVENTION

The following description is provided for a better understanding of various principles of the present invention. However, the details and principles described herein can be modified without departing from the scope and spirit of the invention. In this instance, well-known circuits, control logic, and the details of computer program instructions for conventional algorithms and processes have not been shown in detail in order not to obscure the general concepts unnecessarily.

Software programming code, which embodies aspects of the present invention, is typically maintained in permanent storage, such as a computer readable medium. In a client/server environment, such software programming code may be stored on a client and/or a server. The software programming code may be embodied on any of a variety of known tangible media for use with a data processing system, such as a diskette, or hard drive, or CD-ROM. The code may be distributed on such media, or may be distributed to users from the memory or storage of one computer system over a network of some type to other computer systems for use by users of such other systems.

In cryptography, a side channel attack is any attack based on information gained from the physical implementation of a cryptosystem, rather than theoretical weaknesses in the algorithms. For example, timing information, power consumption, electromagnetic leaks or even sound can be exploited to derive information about the cryptographic aspects of a system. Many side channel attacks require considerable technical knowledge of the internal operation of the system on which the cryptography is implemented.

The term "scrambling" is used herein to describe a form of encrypting information by reordering data according to a key, equivalent to a transposition cipher or by employing simple substitutions. Scrambling is the form of encryption employed in the embodiments of the invention, as it accomplishes the objectives of disguising information from side channel attacks and then recovering the information with minimal computational load. However, should capabilities of the hardware so allow, more sophisticated encryption techniques, including asymmetric algorithms may be substituted for simple scrambling. In some embodiments, data can be stored in a scrambled format, in which case, during execution reapplication of the scrambling algorithm is unnecessary. It is then only necessary to employ a descrambling algorithm.

System Architecture.

Figure 1:
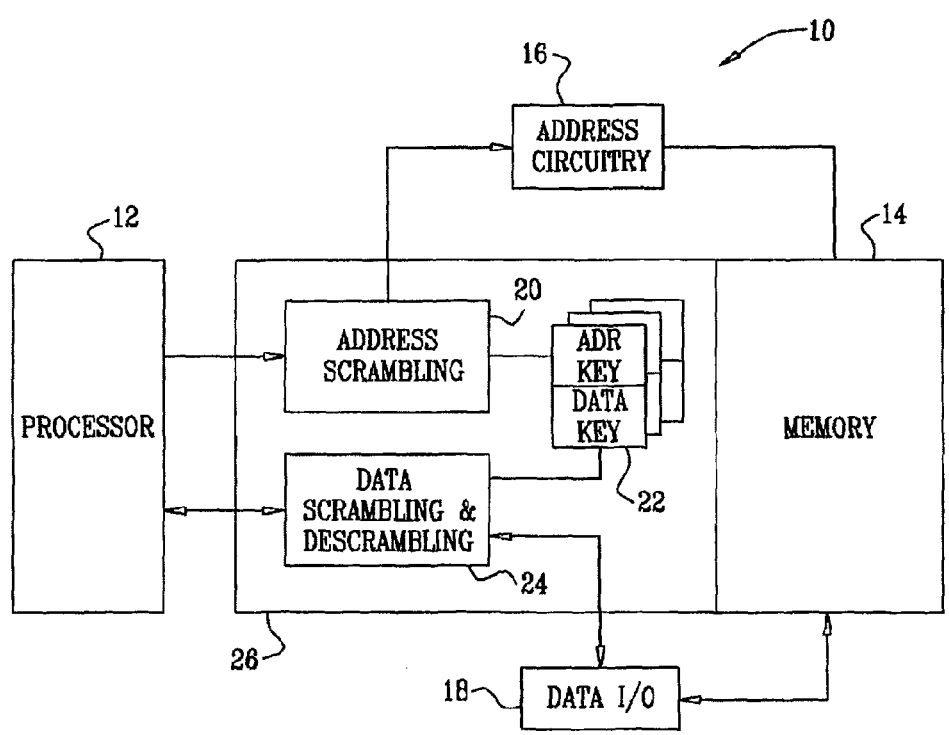
FIG. 1 is a block diagram of a portion of a computing device that is constructed and operative in accordance with a disclosed embodiment of the invention.

Turning now to the drawings, reference is initially made to FIG. 1, which is a block diagram of a portion of an computing device 10 that is constructed and operative in accordance with a disclosed embodiment of the invention. A particular architecture is shown for purposes of explication. However, the principles of the invention are applicable to various architectures and in particular to diverse systems in which data-dependent memory accesses are required. Although portions of the computing device 10 and other drawing figures herein are shown as comprising a number of separate functional blocks, these blocks may not be necessarily separate physical entities. These blocks may represent, for example, different computing tasks or data objects stored in a memory that is accessible to a processor 12.

The processor 12 can be realized as one or more processing units or many combinations of processors and coprocessors. The processor has access to a memory 14 for reading and writing data and obtaining program instructions. The memory 14 can be any form of random access memory known in the art, and is provided with known address circuitry 16 in which bank, row and column decode operations may occur. The memory 14 has data I/O circuitry 18.

When the processor 12 reads or writes data to the memory 14, the desired address, from the point of view of the application requiring the data access, is scrambled prior to physical access to the memory by executing an address cryptographic function 20. A cryptographic key used for this purpose is stored in a key storage memory 22. The address-scrambling process is entirely transparent to application programs being executed by the processor 12 and any operating system in the case of more complex computing devices. The function 20 should be a one-to-one function, in order to avoid memory conflicts. The cryptographic function 20 thus calculates a one-to-one address relationship between a prescrambled memory address and a scrambled memory address, so that data is written at the scrambled memory address.

The prescrambled data being read or written may be scrambled and descrambled, using another set of cryptographic keys, also held in the key storage memory 22, using the same or a different cryptographic algorithm that is executed in a function 24.

Scrambling Functions.

The function 24 used for data scrambling can be any invertible function. In some embodiments, a simple exclusive or (XOR) operation with a constant can be used as the function 24. Alternatively, more complicated substitution functions, such as the well-known S-Box function may be used.

The function 20 for address scrambling may be an invertible function or a non-invertible function, so long as it has a one-to-one property. For example, the function 20 may be the function $(X+(X \, 2 \, OR \, 5)) \bmod 2n$, where X is the input value and n the number of bits required to hold the address.

It is also possible to use an asymmetric cryptographic algorithm for the functions 20, 24, in computing devices having sufficient hardware support. In these embodiments, both the public and private keys are stored in the key storage memory 22.

Both of the functions 20, 24 are implemented as software routines. In some embodiments, the functions 20, 24 and the key storage memory 22 operate in a secure memory 26 to which the processor 12 has limited access during execution. Alternatively, the memory 26 can be a division of the memory 14. In still other embodiments the functions 20, 24 can be executed by an autonomous processing element, e.g., a coprocessor.

From time to time the memory 14 may be reorganized, for example by transferring data to reserved portions of the memory 14 or to a secondary memory (not shown). The cryptographic keys for new accesses to the memory 14 are changed. This may be done by retrieving a new set of cryptographic keys from the key storage memory 22. Alternatively, the new cryptographic keys may be generated using a computational algorithm. Then, using the old cryptographic keys, data are retrieved and rewritten to the memory 14 using the new cryptographic keys. Alternatively, the memory 14 may be simply cleared and then rewritten with data from an external source, using the new cryptographic keys. Changing the cryptographic keys and the arrangement of data in memory in this manner frustrates side channel attacks, by limiting the size of the useful sample of memory access information that an attacker can acquire in an organizational cycle. Indeed, the cryptographic keys can be changed each time it is necessary to perform cryptographic operations.

Operation.

Figure 2:
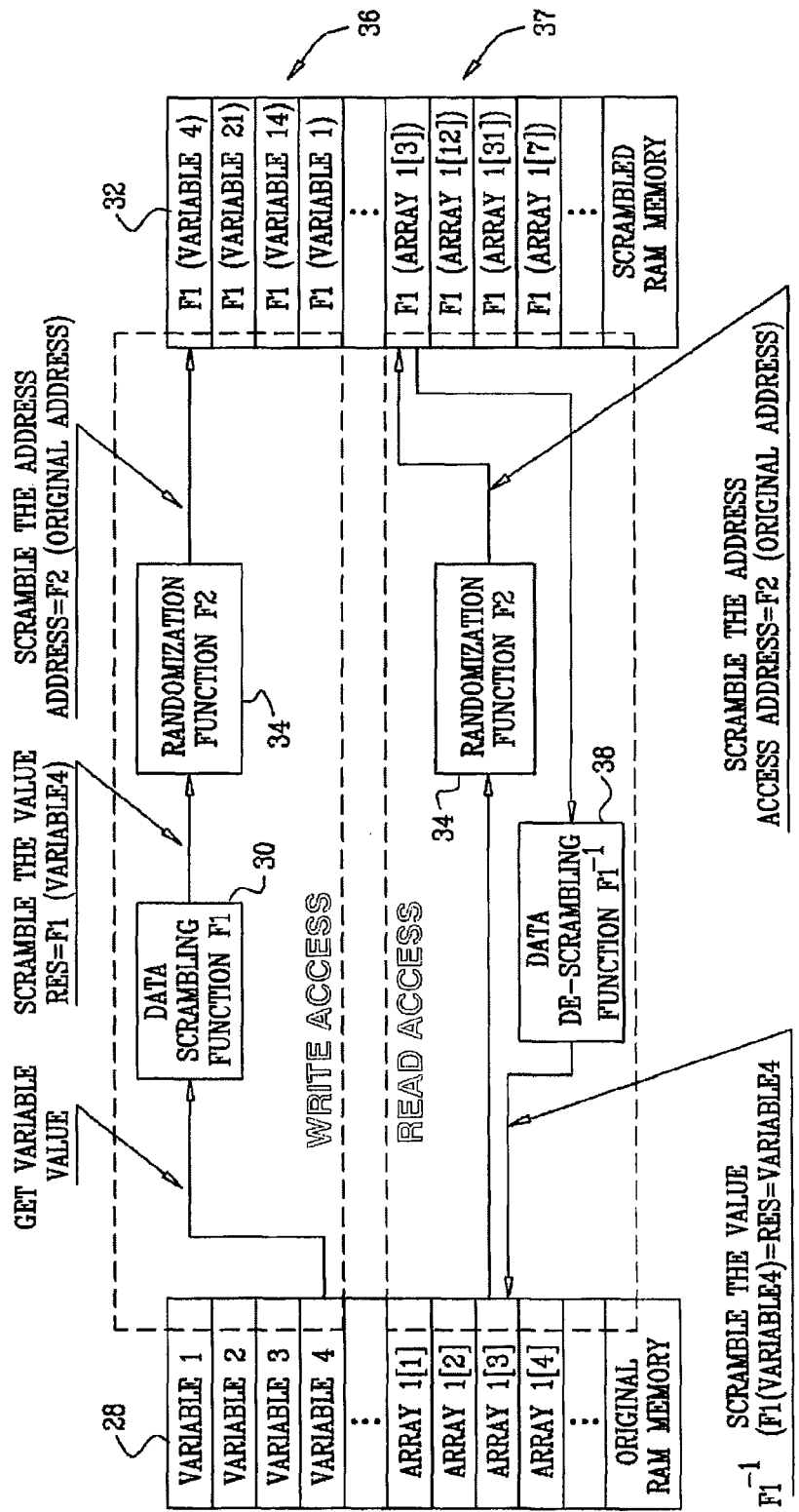
FIG. 2 is a diagram illustrating a mode of memory access operations of the computing device shown in FIG. 1, in accordance with a disclosed embodiment of the invention.

Reference is now made to FIG. 2, which is a diagram illustrating one mode of memory access operations of the computing device 10 (FIG. 1), in accordance with a disclosed embodiment of the invention. In this version, data to be concealed are initially found in a first RAM 28, which could be any suitable readable medium. Four variables (variable1-variable4) and an array having four elements (Array(1) [1]-Array(1) [4]) are stored in order in the RAM 28. The data in the RAM 28 are scrambled by a data scrambling function 30 written to and read from a second RAM 32 and the order of storage changed by a randomization function 34, which changes the data storage addresses. The result is stored in a variable storage area 37 of the RAM 32.

Read access operations for the array is shown in the lower portion of FIG. 2. The randomization function 34 is again applied. When the scrambled array data become available, the inverse of the data scrambling function 30, shown as function 38, is applied to the scrambled data. The original data that was stored in the RAM 28 are recovered.

Figure 3:
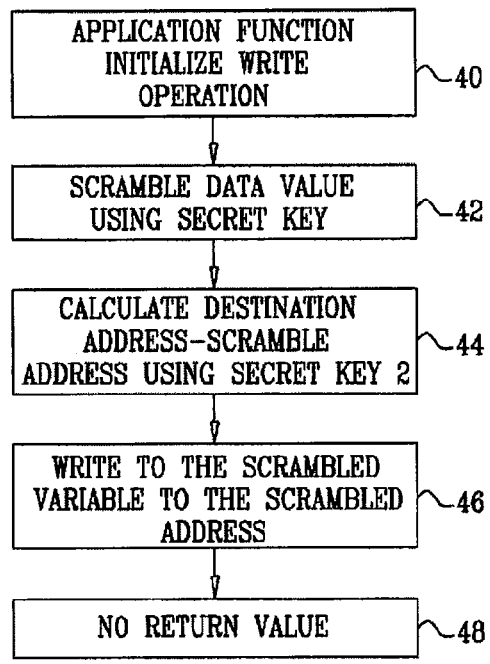
FIG. 3 is a flow chart of a software-implemented method for address scrambling, in accordance with a disclosed embodiment of the invention.

Reference is now made to FIG. 3, which is a flow chart of a software-implemented method for address scrambling, in accordance with a disclosed embodiment of the invention. At initial step 40, an application executing on a computing device initializes a write operation.

Next, at step 42 data to be written are encrypted using a first secret key.

Next, at step 44 a destination address in memory is calculated from a destination address supplied in the run-time environment of the computing device, using a second secret key. The supplied address is encrypted accordingly and provided to the decoding circuitry of the memory.

Next, at step 46, the encrypted data are actually written into the memory at the address that was calculated in step 44.

At final step 48, the procedure terminates. If the write operation was successful, no return value is provided. Otherwise, an error may be raised, in accordance with specifications of the architecture and operating system of the computing device.

Figure 4:
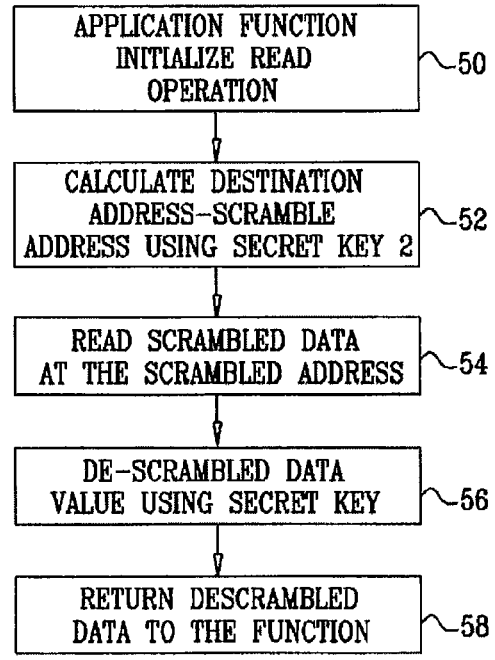
FIG. 4 is a flow chart of a software-implemented method for reading data, in accordance with a disclosed embodiment of the invention.

Reference is now made to FIG. 4, which is a flow chart of a software-implemented method for reading data, in accordance with a disclosed embodiment of the invention. It is assumed that the method described with reference to FIG. 3 has previously been performed.

At initial step 50, an application executing on the computing device initializes a read operation.

Next, at step 52, a destination address in memory is calculated from a destination address supplied in the run-time environment of the computing device. Step 52 is performed identically to step 44.

Next, at step 54 scrambled data are read from the memory at the address calculated in step 52.

Next, at step 56, the scrambled data read in step 54 are decrypted using a secret key. This may be the same key that was used in step 42, or a different key when an asymmetric cryptographic algorithm was used to encrypt the data in step 42.

At final step 58, decrypted data are returned to the requesting application.

Example

Various attacks can be prevented by application of the foregoing principles. One such attack is disclosed in the document Lest We Remember: Cold Boot Attacks on Encryption Keys, J. Alex Haldermany et al., Princeton University—School of Engineering and Applied Science, available on the Internet. The authors demonstrated that DRAMs (Dynamic Random Access Memories) in modern computers retain their contents for seconds to minutes after power is lost, even at operating temperatures and even if removed from a motherboard. Although DRAMs become less reliable when they are not refreshed, they are not immediately erased, and their contents persist sufficiently for malicious or forensic) acquisition of usable full-system memory images. The paper indicates that this phenomenon limits the ability of an operating system to protect cryptographic key material from an attacker with physical access to the computer.

In one software-implemented embodiment, the memory scrambling method described above protects against this type of attack. Merely conducting a simple search of a computer memory will fail to discover a cryptographic key, because the expanded AES key bytes are scrambled in two ways: (1) they are distributed in memory according to an address scrambling function, rather than being located sequentially, and (2) the values of the distributed data bytes are changed according to a data scrambling function.

We can estimate the complexity of a scrambling scheme in this example. A typical AES key has 128 bits (16 Bytes). One common form of expanded AES key has the same values as a non-expanded key, but with specific offsets. Typically, it requires 160 Bytes of memory. While a secret expanded AES key cannot be guaranteed to be distributed over the entire memory space, it will be allocated in a 8 Kbyte memory buffer among other software variables of the same program. Such variables are also scrambled as described above.

We also assume that the attacker does not have knowledge of the software variables. Assume further that the computer RAM holds 4 Gbytes, easily attainable in modern day personal computers. The 8 Kbyte memory buffer itself is dispersed in the scrambling process in the 4 Gbytes of RAM.

In this example, in order to efficiently implement the scrambling algorithm, it has been taken into account that, within large practical limits, a modern personal computer is not restricted in memory size. Moreover, the AES key buffer is frequently accessed during execution of the AES algorithm and must be available relatively quickly to avoid performance degradation. Therefore, substitution tables are employed in order to achieve an efficient software implementation instead of a randomization function.

Figure 5:
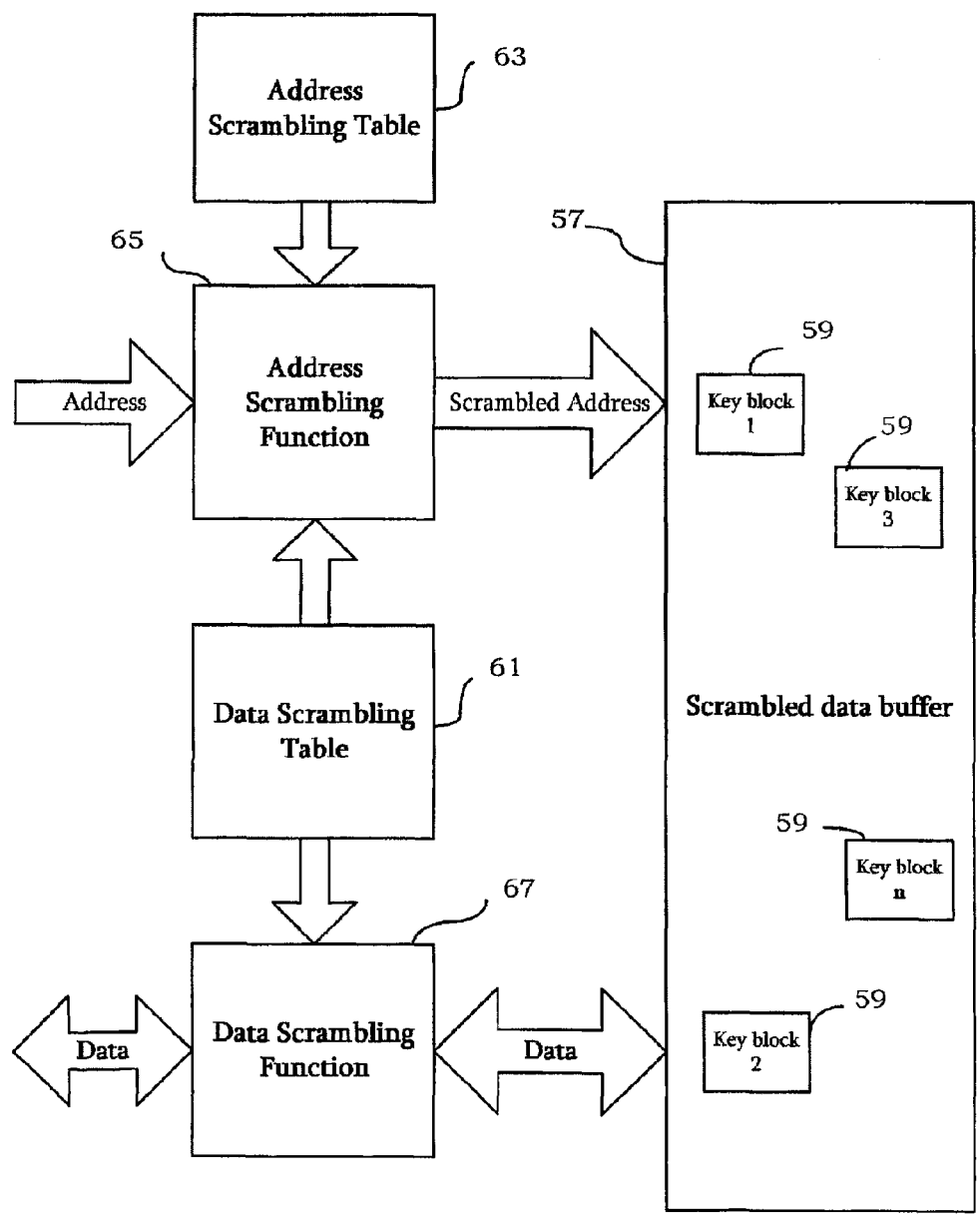
FIG. 5 is a block diagram illustrating a software-implemented memory randomization application, in accordance with a disclosed embodiment of the invention.

Reference is now made to FIG. 5, which is a block diagram illustrating a memory randomization scheme used in this example, in accordance with a disclosed embodiment of the invention. The example employs an address scrambling function 65 and a data scrambling function 67, which have been described above.

Software implementing AES ("AES Software") generates a random masking table of 256 bytes, which is distributed in a computer RAM 57 as a plurality of key blocks 59. The AES Software may require byte access to the data. Therefore, the byte values are scrambled using a data substitution table 61. Each byte in the table 61 defines the masking value for a specific data byte. The table 61 will be generated using a random number generator after every power up or reset operation. Masking is done as follows:

The value of a specific byte is "XORed" with a table value having the same offset value modulo table length:

Masked_Value=Data_Value XOR

Masking_Table[(Values_Address)Modulo Table_Length]

The length of the table 61 is not restricted to 256 bytes and can be any length. However, it is sufficient that the table length not exceed the size of the 8 Kbyte data buffer, in which the key to be protected is distributed.

At this stage, the implementation already provide sophisticated protection against attack. An attacker is unable to simply find repeated bytes in the expanded AES key. Rather, he would have to allocate space for two tables in the memory: (1) a buffer for the scrambled key, and (2) a masking buffer. Both behave as random data. The attacker would be forced to check all possible variables in memory.

There are (2 32)*(2 32)=2 64 possibilities, (where * is a multiplication operator, and is exponentiation). There are 2 32 possibilities for the start of the scrambled key buffer and 2 32 possibilities for the start of the masking buffer.

In a further stage, the encryption is made even more difficult for the attacker. The addresses of the computer's 8 Kbyte memory buffer may be scrambled by building a 16 Kbyte address remapping table 63. Every 2 bytes in the table 63 must include 13 bits having a unique value in the table containing unique remapped addresses of a secret key buffer (13 bits are required in the case of a 8K buffer). This allows data values in the computer's 8 Kbyte buffer to be replaced.

It may be anticipated that the attacker may try to identify the address-remapping table by searching for zero values in the three most significant bits. To protect against this approach, the data and addresses of the table 63 can also be masked, using the same or a different address remapping table.

The remapping of data and addresses in the tables 61, 63 can be implemented by masking the table offset itself, yet preserving the one-to-one mapping in the following way:

New_Offset=Offset_Remapping[Old_Offset, remap_table value from table(j)XOR Masking_Table[i MOD 256]], where table (j) is table 61 or table 63. Then the offset remapping function is defined as:

New offset[old offset, Masking table]=Masking Table [old offset]

where i is an index into the masking table. This operation can be implemented in few clock cycles in a modern processor, assuming all data buffers are located in RAM. It may be noted that while the tables 61, 63 and other functional blocks are shown separately from the RAM 57, they may be implemented within the RAM 57. Alternatively, they may be stored in a different memory unit in various combinations.

At this level of protection of the scheme both data and addresses are scrambled. In order to discover the key in memory, the attacker must now search for three tables in the computer's memory: scrambled data, data masking table and address scrambling table. To obtain the secret key using a brute force approach, a total of 2 96 possibilities must be evaluated (2 32*2 32*2 32=2 96). Of course, it is to be expected that the attacker would attempt to find a more efficient algorithm. Assume that the attacker is able to reduce the search space by half, perhaps by removing some repeating patterns such as 0x00. Nevertheless, he will still need to evaluate 2 90 possibilities. Furthermore, the scrambling approach described above can be easily modified by varying the size of the masking and scrambling tables, and varying the size of the scrambled data buffer. Any bytes in the scrambled data not used for storage of the expanded secret key could be used for other purposes.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A method for concealing information, comprising:
performing by a computing device which is operatively coupled to a memory having first memory addresses and second memory addresses:
  for each first memory address, applying a first one-to-one address relationship to such first memory address for generating a first scrambled memory address and writing data into the memory at the first scrambled memory address;
  obtaining data scrambling entries from a data scrambling table;
  applying a data scrambling function to the data, to an encrypted secret key and to the data scrambling entries obtained from the data scrambling table in order to generate encrypted data and decrypted data and to obtain the encrypted secret key and the decrypted secret key for storage in the memory and retrieval from the memory respectively; and
  distributing the encrypted secret key and the encrypted data in the memory at respective encrypted addresses.

2. The method of claim 1, further comprising:
accessing the memory at the encrypted addresses for respective storage and retrieval of the encrypted secret key and the encrypted data at the encrypted addresses, and retrieval of the decrypted data and the decrypted secret key.

3. The method of claim 1, further comprising:
constructing the address scrambling table and the data scrambling table.

4. The method of claim 1, further comprising:
generating the encrypted secret key and the decrypted secret key.

5. The method of claim 1, further comprising:
reorganizing the memory, wherein reorganizing the memory comprises:
  applying the first one-to-one address relationship a second time to read the data from the memory at the first scrambled memory address; and
  writing the data into the memory at the second memory addresses by applying a second one-to-one address relationship to each such second memory address for generating a second scrambled memory address and writing data into the memory at said second scrambled memory address.

6. The method of claim 5, further comprising:
prior to writing the data, applying a data function to prescrambled data for generating scrambled data; and
writing the scrambled data into the memory as the data.

7. The method of claim 6, further comprising:
applying a second data function to the scrambled data to recover the prescrambled data.

8. The method of claim 6, wherein applying the data function comprises:
applying the data function a first time to a first prescrambled data using a first data encryption key and applying the data function a second time to a second prescrambled data using a second data encryption key to generate a first scrambled data and a second scrambled data, respectively.

9. A computing device comprising:
at least one memory having first memory addresses and second memory addresses, the at least one memory storing instructions; and
a processor configured to access the at least one memory to execute the instructions stored in the at least one memory and to:
  for each first memory address, apply a first one-to-one address relationship to such first memory address for generating a first scrambled memory address and writing data into the memory at the first scrambled memory address;
  obtain data scrambling entries from a data scrambling table;
  apply a data scrambling function to the data, to an encrypted secret key and to the data scrambling entries obtained from the data scrambling table in order to generate encrypted data and decrypted data and to obtain the encrypted secret key and the decrypted secret key for storage in the memory and retrieval from the memory respectively; and
  distribute the encrypted secret key and the encrypted data in the memory at respective encrypted addresses.

10. The computing device of claim 9, wherein the processor is further configured to:
access the memory at the encrypted addresses for respective storage and retrieval of the encrypted secret key and the encrypted data at the encrypted addresses, and retrieval of the decrypted data and the decrypted secret key.

11. The computing device of claim 9, wherein the processor is further configured to:
construct the address scrambling table and the data scrambling table.

12. The computing device of claim 9, wherein the processor is further configured to:
generate an encrypted secret key and a decrypted secret key.

13. The computing device of claim 9, wherein the processor is further configured to reorganize the memory, wherein to reorganize the memory the processor is configured to:
apply the first one-to-one address relationship a second time to read the data from the memory at the first scrambled memory address; and
write the data into the memory at the second memory addresses by applying a second one-to-one address relationship to each such second memory address for generating a second scrambled memory address and writing data into the memory at the second scrambled memory address.

14. The computing device of claim 13, wherein the processor is further configured to:
   prior to writing the data, apply a data function to prescrambled data for generating scrambled data; and
   write the scrambled data into the memory as the data.

15. The computing device of claim 14, wherein the processor is further configured to:
   apply a second data function to the scrambled data to recover the prescrambled data.

16. The computing device of claim 14, wherein to apply the data function, the processor is configured to:
   apply the data function a first time to a first prescrambled data using a first data encryption key and apply the data function a second time to a second prescrambled data using a second data encryption key to generate a first scrambled data and a second scrambled data, respectively.

* * * * *